UNITED STATES PATENT OFFICE.

OTTO N. BERNDT, OF CHICAGO, ILLINOIS, ASSIGNOR TO LINDSAY LIGHT COMPANY, OF CHICAGO, ILLINOIS, A CORPORATION OF ILLINOIS.

ART OF RECOVERING THORIUM FROM MONAZITE SANDS.

1,323,735.      Specification of Letters Patent.      Patented Dec. 2, 1919.

No Drawing.      Application filed June 27, 1917. Serial No. 177,285.

*To all whom it may concern:*

Be it known that I, OTTO N. BERNDT, a citizen of the United States, residing at Chicago, in the county of Cook and State of Illinois, have invented a new and useful Improvement in the Art of Recovering Thorium from Monazite Sands, of which the following is a specification.

This invention relates to the art of recovering thorium from monazite sands and to a new thorium compound produced during such recovery.

It has heretofore been proposed to effect the recovery of thorium from such sands by a two-step process, involving, first the heating of the sand with excess of sulfuric acid, whereby the thorium, as well as the rare earths, and some other constituents thereof, were rendered soluble in dilute acids and subsequently effecting a selective precipitation from this solution by the addition of various reagents, by which means the thorium was thrown down in a more or less pure state.

It is found that by conducting the first stage of the process under the conditions which will later be described, it is possible to render the rare earths soluble in water or dilute acids leaving the thorium in the form of an insoluble compound, thus allowing by treatment of the product of the first stage of this process with water and filtration a simple and direct concentration of the thorium, without the necessity of first converting the thorium into a soluble form and then dissolving and precipitating it.

In general, the operation of the present process may be regarded as taking place as follows:

As is well known, monazite is essentially a phosphate of rare earths and thorium, in which the percentage of thorium varies as a rule from one to ten per cent. The rare earths are chiefly cerium, lanthanum and didymium. Monazite usually also contains small amounts of titanium, zirconium and iron.

The chemical changes occurring during the heating of monazite with concentrated sulfuric acid are probably complex on account of the large number of elements present in the monazite.

It seems probable that the first action of sufficient hot concentrated sulfuric acid on monazite gives rise to a mixture of normal or acid sulfates and phosphates of the bases present. If this product is treated with water, the larger part, including much of the thorium, will dissolve. But, if the product of the first action of hot concentrated sulfuric acid on monazite be further heated for several hours at about 280° to 300° C. water and sulfuric acid are driven off and the thorium compound is slowly converted into a phosphatic compound of thorium insoluble in water and dilute acids.

As a result of investigation of the nature of the reaction and the chemical composition of the product obtained, it is believed that the insoluble crystalline compound resulting from the process is a double salt of thorium containing metaphosphate and sulfate radicals and probably being of the formula, $Th(PO_3)_2SO_4$. Thus the results of an analysis of the compound obtained as compared with the calculated percentages of its components on the basis of the above formula, gives the following results:

|  | Found. | Calculated. |
|---|---|---|
| $ThO_2$ | 54% | 54.25% |
| $P_2O_5$ | 28.5 | 29.21 |
| $SO_3$ | 16.3 | 16.46 |

With regard to the mechanism of the process, it is believed that the first heating of the monazite sand with the concentrated sulfuric acid results in the formation of a sulfate of thorium, soluble in water. On raising the temperature, it is believed that there is a gradual rearrangement of the composition of the compound, with partial elimination of its sulfate content and substitution of the metaphosphate radical.

This compound has been made in substantially pure state in the following manner:

12 grams of thorium sulfate crystals $(Th(SO_4)_2.8H_2O)$ were dissolved in 5 cc. of hot 80% syrupy orthophosphoric acid to a clear solution. This was heated several hours at a constant temperature of 280° C. During the heating water and fumes of sulfuric acid were evolved and at the end of ten hours heating the product was a nearly solid mass of minute, acicular white crystals. The mass was mixed with 15 parts by weight of 3% sulfuric acid and stirred two hours. Practically none of the thorium had dissolved in the acid solution which was separated from the white, insoluble residue by filtration. This residue consisted of minute, needle-shaped, white crystals of exactly the same form as those present in the mass before it was stirred with dilute sulfuric acid.

It has now been discovered that by the use of a fairly definite proportion of sulfuric acid and by a careful and exact control of the manner of heating, monazite sand is first completely attacked by the acid and is subsequently so changed by continued heating that by treating the products with water only the rare earths go into solution, while the thorium remains almost wholly in the insoluble residue in a greatly concentrated form. The thorium is present in this residue in the form of acicular crystals, insoluble in water and dilute acids and apparently identical with the pure substance obtained as hereinbefore described.

In the practice of this invention it is preferred to follow the procedure given below:

500 pounds of monazite sand showing average of nine per cent. of thorium oxid has added thereto upward of 400 and preferably about 500 pounds of sulfuric acid of 1.84 specific gravity.

This mixture is heated or digested with constant stirring for eight hours at a temperature of about 175° C., during which time the monazite reacts almost completely with the sulfuric acid, probably to form normal acid or sulfates and phosphates of the basic elements contained in the monazite sand.

The temperature of the mass is then raised to between 250° to 300° C., and the heating and stirring are continued for a period of about twelve hours at this higher temperature. At the end of the time mentioned, a sample taken from the batch and stirred with fifteen parts by weight of a 2% solution of sulfuric acid and filtered should give a clear solution which is practically free from dissolved thorium.

A test of this sample having shown that practically all the thorium in the batch is present in a form insoluble in dilute sulfuric acid, the heating is discontinued, the mass permitted to cool, being meanwhile stirred, and then removed from the baking retort or digester. The product is solid or nearly solid and weights about 875 pounds for 500 pounds of sand and 500 pounds acid taken. The product should not weigh less than 825 pounds nor more than 950 pounds. Commercial grades of monazite sand frequently contain from ten to 15% foreign matter consisting largely of quartz, zircon and ilmenite. These substances in moderate amounts do not seriously interfere with the application of the present process, but allowance must be made for their presence in computing the amounts of sulfuric acid necessary and the weight of the final product. The figures given above refer to India commercial sand which contains about 90% monazite.

The solid produced as above described is stirred with 5 to 20 parts by weight of water, the proportion of water allowable being variable within wide limits, and the stirring continued until the solid mass is completely disintegrated. The product is a solution of salts of the rare-earths and other bases present in the monazite together with an excess of sulfuric and phosphoric acids, and contains the insoluble compound of thorium, in suspension as a finely divided, largely crystalline, solid. This solid is now separated from the solution by filtration.

Almost the whole of the thorium content of the monazite is now present in the filter-cake so obtained. The further purification of the thorium can now be accomplished by the usual known methods.

From the foregoing example the nature and mode of carrying out this invention will be perfectly understood. It may be mentioned that the temperatures of 175° and 300° C. given above are approximate only, and so also are the times, *i. e.*, eight hours, for the preliminary digestion and twelve hours, during which the baking was conducted at this higher temperature. Care must be taken that the mass does not rise in temperature to a point at which the rare-earths are converted into compounds insoluble in dilute acids. But the heating must be continued until the thorium has been changed into an insoluble form.

While I have described in considerable detail one manner of carrying out my invention, it is to be understood that this is illustrative only, and for the purpose of making the invention more clear, and that I do not regard this invention as limited to the details of procedure described, nor as dependent upon the soundness or accuracy of the chemical theories which I have advanced.

What I claim as new and desire to secure by Letters Patent, is:

1. The improvement in the art of recovering thorium from monazite sands, which consists in converting the thorium content of monazite sand into a product insoluble in water and dilute sulfuric acid by long continued heating of the monazite with concentrated sulfuric acid attaining a temperature upward of 250° C.

2. The improvement in the art of recovering thorium from monazite sands, which consists in converting the thorium content of monazite sand into a crystalline product insoluble in water and dilute sulfuric acid by long continued heating of the monazite with concentrated sulfuric acid attaining a temperature upward of 250° C.

3. The improvement in the art of recovering thorium from monazite sands, which consists in heating monazite sands with concentrated sulfuric acid in such a manner as to convert the thorium into a product insoluble in water and dilute sulfuric acid, and subsequently dissolving the more readily soluble constituents of the treated mass, whereby there remains an insoluble concentrate of thorium.

4. The improvement in the art of recovering thorium from monazite sands which consists in digesting the said sands with an excess of sulfuric acid sufficient to decompose the sands and subsequently heating the mixture to a temperature sufficient to cause the evolution of sulfuric acid fumes and to convert the thorium present into an insoluble crystalline compound.

5. The improvement in the art of recovering thorium from monazite sands which consists in heating such sand with concentrated sulfuric acid until the sand has been completely decomposed, and prolonging the heating at temperatures between 250 and 300° C. until the thorium is largely converted into a crystalline product insoluble in water and dilute sulfuric acid.

6. The improvement in the art of recovering thorium from monazite sand, which consists in heating monazite sand with concentrated sulfuric acid at a temperature and for such a length of time as to convert the thorium present into a soluble phosphate, and continuing the heating at temperatures between 250 and 300° C. until the thorium compound is converted into an insoluble crystalline thorium compound.

7. The improvement in the art of recovering thorium from monazite sand, which consists in heating monazite sand with concentrated sulfuric acid until the sand has been completely decomposed and then heating at temperatures between 250 and 300° C. until the thorium is converted into a product insoluble in water and dilute sulfuric acid and separating such insoluble thorium product by dissolving out of the treated mass the soluble rare earth compounds contained therein.

8. The improvement in the art of treating monazite sands, which consists in heating such sands with concentrated sulfuric acid, and at a temperature below 250° C. until the sand has been completely decomposed, and subsequently heating at temperatures upward of 250° C. until the thorium is converted into an insolluble crystalline compound, while the admixed rare earth compounds remain readily soluble in dilute sulfuric acid.

9. The improvement in the art of recovering thorium from monazite sands which consists in baking said sands with at least 8/10 times its weight of concentrated sulfuric acid for a length of time sufficient to decompose the sand and subsequently heating the mixture to a temperature sufficiently high to effect the conversion of the thorium into an insoluble form.

10. The improvement in the art of recovering thorium from monazite sand, which consists in heating monazite sand with more than 8/10 times its weight of concentrated sulfuric acid until the sand has been completely decomposed and continuing the heating at temperatures between 250 and 300° C. for a sufficient period of time to drive off water and sulfuric acid and reduce the weight of the treated mass to between 1.65 and 1.9 times the mass monazite sand used.

11. The improvement in the art of treating monazite sands, which consists in heating such sand with more than 8/10 times their weight of concentrated sulfuric acid, attaining temperatures upward of 250° C. until the mass of the treated product is reduced to 1.65 to 1.9 times that of the monazite sand used.

12. The improvement in the art of recovering thorium from monazite sands, which consists in heating such sands with approximately equal quantities of concentrated sulfuric acid at a temperature of about 175° C. for eight hours, and subsequently raising the temperature to 250° to 300° C. and continuing the heating for a period of 12 hours, whereby the thorium is converted into a product insoluble in water and dilute sulfuric acid and the admixed rare earths are at the same time converted into compounds readily soluble in dilute sulfuric acid.

13. As an article of manufacture, a phosphatic thorium compound in the form of needle-like crystals and containing the sulfate radical.

14. As an article of manufacture, an insoluble crystalline thorium phosphatic compound containing the sulfate radical.

15. An insoluble double meta-phosphate and sulfate of thorium.

OTTO N. BERNDT.